(12) United States Patent
Ozias et al.

(10) Patent No.: US 8,890,013 B2
(45) Date of Patent: *Nov. 18, 2014

(54) SUB-MEMBRANE KEYCAP INDICATOR

(71) Applicants: Orin M. Ozias, Austin, TX (US); Robert C. Nerhood, II, Round Rock, TX (US)

(72) Inventors: Orin M. Ozias, Austin, TX (US); Robert C. Nerhood, II, Round Rock, TX (US)

(73) Assignee: Dell Products LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/261,916

(22) Filed: Apr. 25, 2014

(65) Prior Publication Data

US 2014/0233171 A1 Aug. 21, 2014

Related U.S. Application Data

(63) Continuation of application No. 13/117,463, filed on May 27, 2011, now Pat. No. 8,748,767.

(51) Int. Cl.
| | |
|---|---|
| *H01H 9/00* | (2006.01) |
| *H01H 13/02* | (2006.01) |
| *H01H 3/12* | (2006.01) |
| *G06F 1/16* | (2006.01) |
| *H01H 13/83* | (2006.01) |

(52) U.S. Cl.
CPC ............ *H01H 13/023* (2013.01); *H01H 3/125* (2013.01); *G06F 1/1662* (2013.01); *H01H 13/83* (2013.01); *H01H 2219/016* (2013.01)
USPC ........................................ 200/310

(58) Field of Classification Search
USPC .................. 200/5 A, 310–315, 521, 513, 341
See application file for complete search history.

(56) References Cited

U.S. PATENT DOCUMENTS

| | | | |
|---|---|---|---|
| 4,334,134 A | 6/1982 | Janda | |
| 4,449,024 A | 5/1984 | Stracener | |
| 5,252,798 A | 10/1993 | Kamada | |
| 5,285,037 A | 2/1994 | Baranski et al. | |
| 5,408,060 A | 4/1995 | Muurinen | |
| 6,007,209 A | 12/1999 | Pelka | |
| 6,608,271 B2 | 8/2003 | Duarte | |
| 6,747,226 B2 * | 6/2004 | Watanabe | 200/520 |
| 6,860,612 B2 | 3/2005 | Chiang et al. | |
| 6,918,677 B2 | 7/2005 | Shipman | |
| 7,244,898 B2 | 7/2007 | Kim | |
| 7,335,844 B2 * | 2/2008 | Lee et al. | 200/310 |
| 7,394,033 B2 | 7/2008 | Kim | |
| 7,655,901 B2 | 2/2010 | Idzik et al. | |
| 7,741,979 B2 | 6/2010 | Scholsser et al. | |
| 7,772,987 B2 | 8/2010 | Shows | |
| 7,786,395 B2 | 8/2010 | Ozias et al. | |
| 8,224,391 B2 | 7/2012 | Kim et al. | |
| 8,411,029 B2 | 4/2013 | Casparian et al. | |

(Continued)

*Primary Examiner* — Edwin A. Leon
(74) *Attorney, Agent, or Firm* — Egan, Peterman & Enders LLP.

(57) ABSTRACT

Sub-membrane keycap indicators for keyboard assemblies may be implemented by positioning an indicator light element beneath a switch membrane circuit and within the baseplate of a key device. The indicator light element may be so positioned to direct light upward in a substantially narrow cone to an aperture or lightguide molded into a keycap in order to illuminate or light the indicator aperture or lightguide to indicate the current status of at least one component of an information handling system.

27 Claims, 7 Drawing Sheets

(56) References Cited

U.S. PATENT DOCUMENTS

| | | |
|---|---|---|
| 8,502,094 B2 | 8/2013 | Chen |
| 2003/0072595 A1 | 4/2003 | Al-Safar |
| 2005/0073446 A1 | 4/2005 | Lazaridis et al. |
| 2006/0022951 A1 | 2/2006 | Hull |
| 2007/0065215 A1 | 3/2007 | Brown |
| 2007/0235307 A1 | 10/2007 | Liao et al. |
| 2007/0285393 A1 | 12/2007 | Ishakov |
| 2008/0179172 A1 | 7/2008 | Sellers |
| 2009/0007758 A1 | 1/2009 | Scholsser et al. |
| 2009/0127084 A1 | 5/2009 | Ozias et al. |
| 2009/0178913 A1 | 7/2009 | Peterson et al. |
| 2009/0189790 A1 | 7/2009 | Peterson et al. |
| 2010/0090957 A1 | 4/2010 | Idzik et al. |
| 2010/0148999 A1 | 6/2010 | Casparian et al. |
| 2010/0288607 A1 | 11/2010 | Ozias et al. |
| 2010/0321301 A1 | 12/2010 | Casparian et al. |
| 2011/0095877 A1 | 4/2011 | Casparian et al. |
| 2011/0102325 A1 | 5/2011 | Sato et al. |
| 2011/0102326 A1 | 5/2011 | Casparian et al. |
| 2012/0298491 A1 | 11/2012 | Ozias et al. |
| 2013/0100028 A1 | 4/2013 | Mahowald et al. |
| 2013/0178292 A1 | 7/2013 | Casparian et al. |

* cited by examiner

SECTION AA

SECTION AA

SUB-MEMBRANE KEYCAP INDICATOR

This application is a continuation of pending U.S. patent application Ser. No. 13/117,463, filed on May 27, 2011 and entitled "Sub-Membrane Keycap Indicator", the entire disclosure of the foregoing application being incorporated herein by reference.

FIELD OF THE INVENTION

This invention relates generally to information handling systems and, more particularly, to keycap indicators for information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Conventional stand alone "monoblock" style keyboards for desktop computer information handling systems have employed an indicator aperture defined within the bounds of a keycap that is selectively lit by an underlying light emitting diode (LED) to indicate the current status of the information handling system, e.g., such as a "Caps Lock", "Num Lock" or "Scroll Lock" status condition. Such monoblock keyboards are configured with a plastic part having sleeves that receive sliding mechanisms that are attached to the keycaps, i.e., the keycaps are attached to square pillars that slide through corresponding mating holes on the mono-block. Switch mechanisms for the respective keys are positioned below the monoblock. An illumination source in the form of a LED corresponding to each key cap indicator is typically placed on a printed circuit board (PCB) that is positioned below the mono-block. The key stroke length of such a desktop-style keyboard mechanism allows room for placement of a concentric light shield under the keycap adjacent the indicator aperture to allow light from the LED to reach the aperture, while at the same time preventing LED light bleed from under and around the perimeter of the keycap.

For notebook computer applications, the thickness of the keyboard assembly is reduced to a minimum to facilitate the reduced thickness of the notebook computer. As such, the conventional mono-block assembly keyboard is typically not used for notebook computers. Rather, a notebook keyboard typically employs a "scissor mechanism" that employs a set of plastic parts that allow the keycap to traverse up and down in a vertical path. The spring mechanism for this style of notebook keyboard is a rubber dome that collapses and creates switch closure when the rubber dome is fully collapsed. There is insufficient room under such a notebook keycap for placement of a traditional light guide or light mask that is typically utilized in a desktop keyboard assembly.

FIG. 1 illustrates a conventional notebook key device 100 that includes a keycap 102 supported by a collapsible dual lever (scissor) action key mechanism that supports the keycap 102 by utilizing mating lever members 108 and 109 that are secured at one end through a multi-layer keyboard switch membrane (silver ink on Mylar) circuit 106 to a baseplate 104 of a notebook keyboard assembly at a hinge point 130 and to a slidable stopper 132 at the other end. The mating lever members 108 and 109 are configured to pivot downward relative to each other with a scissor-like action when the keycap 102 is depressed, and are provided with a spring mechanism in the form of a resilient rubber dome member 110 that returns the keycap 102 upward to its unpressed position when the keycap 102 is no longer pressed. Rubber dome 110 is also configured to contact and depress circuitry layers together within switch membrane circuit 106 so as to make electrical contact and complete an electrical circuit for a key input signal when keycap 102 is depressed.

FIG. 1 also illustrates indicator aperture and lightguide 118 that is present for transmitting an indicator light to a user of a keyboard assembly that includes the notebook key device 100. For example, keycap 102 may be a "CAPS LOCK" key of a notebook keyboard, and light 120 may be selectively projected from indicator aperture 118 to indicate when the keyboard assembly of the corresponding notebook computer is in "CAPS LOCK" mode. A keycap indicator light emitting diode (LED) 112 is placed in an upward firing position on conductive solder placed on the top surface of the switch membrane circuit 106 in position below the indicator lightguide 118. Indictor LED 112 is encased with an ultraviolet (UV) glue 114 as shown to bond the indicator LED 112 to the solder and switch membrane circuit 106 and to protect the indictor LED 112 from electrostatic discharge (ESD). UV glue 114 is employed to retain the electrical and physical connection of the indictor LED 112 as it cannot be traditionally soldered to a silver-ink/Mylar circuit utilizing a reflow process. UV glue 114 acts as a lens that further scatters light from the indicator LED in a light cone pattern 116 that results in an area 122 of light bleed from the light cone 116 outside the perimeter of the keycap 102.

Current masking techniques require additional hand placed Mylar sections, extra cost, and are inconsistent causing LED's to be obscured and resulting in dim indicators. Light bleed is less of a problem for frame (Chiclet) keyboards due to the shielding they provide, but this type of keyboard also increases cost.

It has also been proposed to couple a separate flexible concentric rubber dome illumination guide to the membrane underneath a notebook keycap over an LED indicator and adjacent to an indicator aperture defined in the keycap. The flexible illumination guide flexes when contacted by downward movement of the keycap. This method may cause the key to feel stiffer than other similar sizes keys.

For backlighting the multiple keycaps of a notebook computer keyboard, it is known to place a light source underneath the baseplate and membrane circuitry of the keyboard and to provide an aperture in the keyboard baseplate and membrane circuit that is aligned with and positioned directly beneath the stabilizer mechanism of each key device for transmitting light to backlight all of the overlying keycaps together at one time. In such a configuration, each keycap may be provided with a translucent section that transmits the backlight through the keycap to illuminate an icon which indicates the identity of each key, i.e., "F" key, "G" key, "Tab" key, etc.

SUMMARY OF THE INVENTION

Devices and methods are disclosed herein for providing a keycap indicator for a keyboard assembly (e.g., such as for a portable information handling system like a notebook computer). The disclosed devices and methods may be implemented in one embodiment by positioning (e.g., embedding) an indicator light element (e.g., such as a LED element) beneath a translucent or substantially transparent switch membrane circuit and within the baseplate of a key device. Alternatively, an indicator light element may be positioning within the baseplate of a key device beneath a substantially opaque switch membrane circuit, with a light transmitting aperture defined in the switch membrane circuit above the indicator light element. In either case, the indicator light element may be so positioned in one embodiment to direct light upward from a position within the baseplate and beneath the switch membrane circuit to a light-transmitting indicator feature (e.g., aperture with lightguide molded or otherwise provided therein) in a keycap in order to illuminate or light the light-transmitting indicator feature, e.g., to indicate the current status of at least one component of the information handling system (e.g., such as a "Caps Lock", "Num Lock" or "Scroll Lock" condition of keyboard assembly input signal processing).

In one embodiment, an indicator light element may be positioned to direct a status-indicating light upward from beneath the switch membrane circuit to a light transmitting feature in the form of a lightguide molded into a keycap. This status-indicating light may be so directed upward in a pattern (e.g., narrow or contained light cone pattern) that is sufficiently narrow or contained within the periphery of the overlying keycap so as to reduce or substantially eliminate unwanted light bleed in the space between the keycap and the baseplate outwardly past the periphery of the overlying keycap that contains the indicator lightguide, e.g., so as to allow placement and illumination of a status-indicating aperture or lightguide off-center and near the periphery of the keycap. In a further embodiment, a mask may be optionally provided over the indicator light element in a position above the switch membrane circuit to further narrow the upwardly emitted light pattern, e.g., to allow closer placement to the periphery of a keycap without causing light bleed outwardly past the periphery of the overlying keycap that contains the indicator lightguide. Such a mask may be formed, for example, by utilizing membrane printing to mask around and above the indicator light element. In another exemplary embodiment, the disclosed devices and methods may be implemented to reduce or substantially eliminate light bleed outward from around the periphery of an indicator keycap without requiring additional masking parts (such as a Mylar sheet placed above the membrane material) or the presence of a flexible illumination guide.

In one respect, disclosed herein is a key device, including: a baseplate; a keycap coupled to the baseplate in spaced upward and downward movable relationship, a light transmitting feature being provided in the keycap and configured to transmit light through the keycap; switch membrane circuitry disposed above the baseplate and between the keycap and the baseplate, at least a portion of the switch membrane circuitry being configured to transmit light from below the membrane to above the membrane; and an indicator light element provided within the baseplate and configured to direct light upward from within the baseplate through the switch membrane circuitry to the light-transmitting indicator feature within the keycap.

In another respect, disclosed herein is an information handling system including: at least one processing device, and at least one key device coupled to the processing device. The key device itself may include: a baseplate, a keycap coupled to the baseplate in spaced upward and downward movable relationship, a light transmitting feature being provided in the keycap and configured to transmit light through the keycap, switch membrane circuitry disposed above the baseplate and between the keycap and the baseplate, the switch membrane circuitry being configured to provide an input signal to the processor in response to downward pressure applied to the switch membrane circuitry by downward movement of the keycap, and at least a portion of the switch membrane circuitry being configured to transmit light from below the membrane to above the membrane, and an indicator light element provided within the baseplate and configured to direct light upward from within the baseplate through the switch membrane circuitry to the light-transmitting indicator feature within the keycap.

In another respect, disclosed herein is a method of illuminating an indicator keycap of a key device that includes the step of providing a key device that itself includes: a baseplate, a keycap coupled to the baseplate in spaced upward and downward movable relationship, a light transmitting feature being provided in the keycap and configured to transmit light through the keycap, switch membrane circuitry disposed above the baseplate and between the keycap and the baseplate, and an indicator light element provided within the baseplate. The method may also include directing light upward from the indicator light within the baseplate through the switch membrane circuitry to the light-transmitting indicator feature within the keycap.

DESCRIPTION OF ILLUSTRATIVE EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
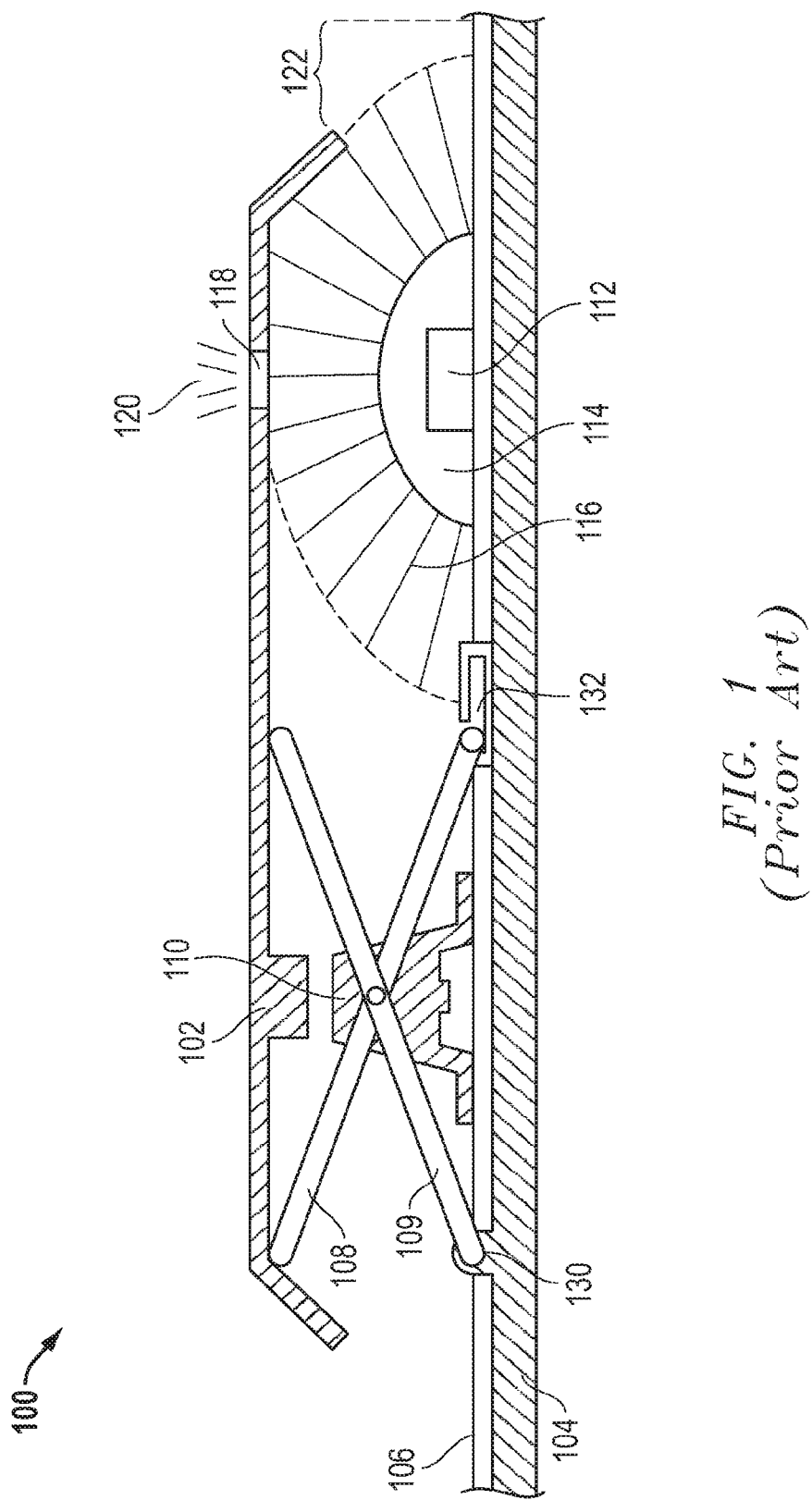
FIG. 1 is a cross-sectional view of a conventional notebook key device.
Figure 2:
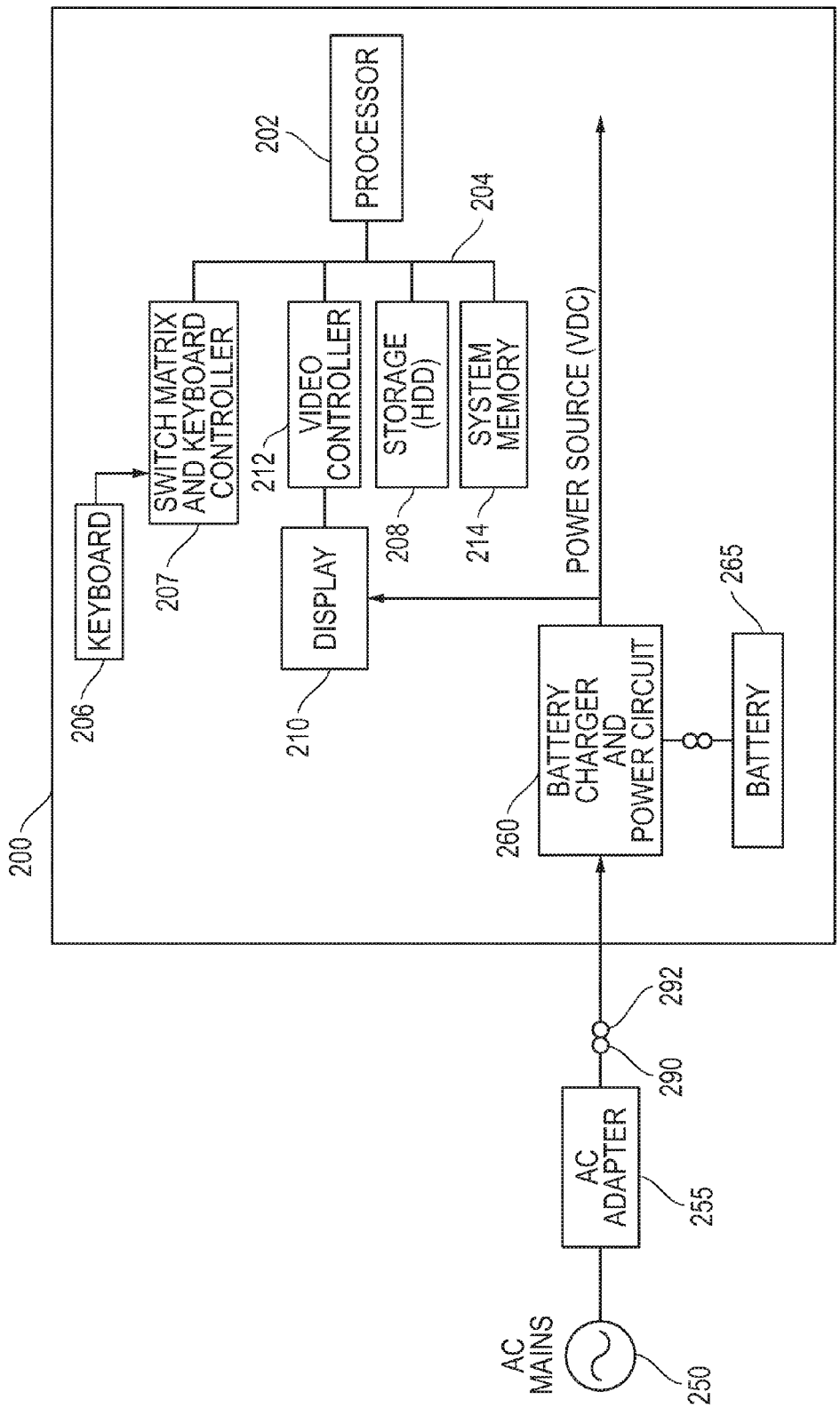
FIG. 2 is a simplified block diagram of an information handling system according to one exemplary embodiment of the disclosed devices and methods.

FIG. 2 illustrates a block diagram of an information handling system 200 (e.g., portable information handling system such as notebook computer, MP3 player, personal data assistant (PDA), cell phone, cordless phone, etc.) as it may be configured according to one exemplary embodiment of the disclosed devices and methods. As shown in FIG. 2, information handling system 200 of this exemplary embodiment includes a processor such as an Intel Pentium series processor, an Advanced Micro Devices (AMD) processor or one of many other processors currently available. Processor 202 is coupled to a bus 204 that serves to connect processor 202 to other components of information handing system 200 as shown. Keyboard assembly 206 and one or more other optional input device/s (e.g., pointing devices such as touchscreen, mouse, trackball, touchpad, etc.) may be coupled as shown to provide input to processor 202 and to enable the user to interact with the information handling system 200. As shown keyboard assembly 206 provides key device input to processor 202, in this case via switch matrix and keyboard controller 207. In FIG. 2, switch matrix and keyboard controller components are represented together and function in a manner and configuration that is known in the art, with the keyboard controller scanning the switch matrix for signals to determine which key devices of keyboard assembly 206 have been depressed and reporting this information to processor 202. Programs and data may be stored on storage 208 (e.g., hard disk/s, optical disk/s, etc.). Information handling system 200 also includes a display 210 (e.g., LCD display in the case of notebook computer) coupled to processor 202 by a video controller 212. System memory 214 is also coupled to processor 202 to provide processor 202 with fast storage to facilitate execution of computer programs by processor 202. In the case of a notebook computer or other form of portable information handling system, a keyboard and optional track pad may in one embodiment be integrated into the chassis of the information handling system together with other information handing system components described above.

In the particular embodiment of FIG. 2, information handling system 200 is coupled to an external source of power, namely AC mains 250 and AC adapter 255. It will be understood that external power may alternatively be provided from any other suitable external source (e.g., external DC power source) or that AC adapter 255 may alternatively be integrated within a chassis of information handling system 200 such that AC mains 250 supplies AC power directly to information handling system 200. As shown AC adapter 255 is removably coupled to, and separable from, battery charger/power circuit 260 of information handling system 200 at mating interconnection terminals 290 and 292 in order to provide information handling system 200 with a source of DC power to supplement DC power provided by battery cells of a battery system in the form of smart battery pack 265, e.g., lithium ion ("Li-ion") or nickel metal hydride ("NiMH") battery pack including one or more rechargeable batteries and a BMU that includes an analog front end ("AFE") and microcontroller. It will be understood that the embodiment of FIG. 2 is exemplary only, that other buses and intermediate circuits may be coupled between the components described above and processor 202 to facilitate interconnection between the components and the processor 202, and that a variety of other components and alternative configurations are possible.

Figure 3:
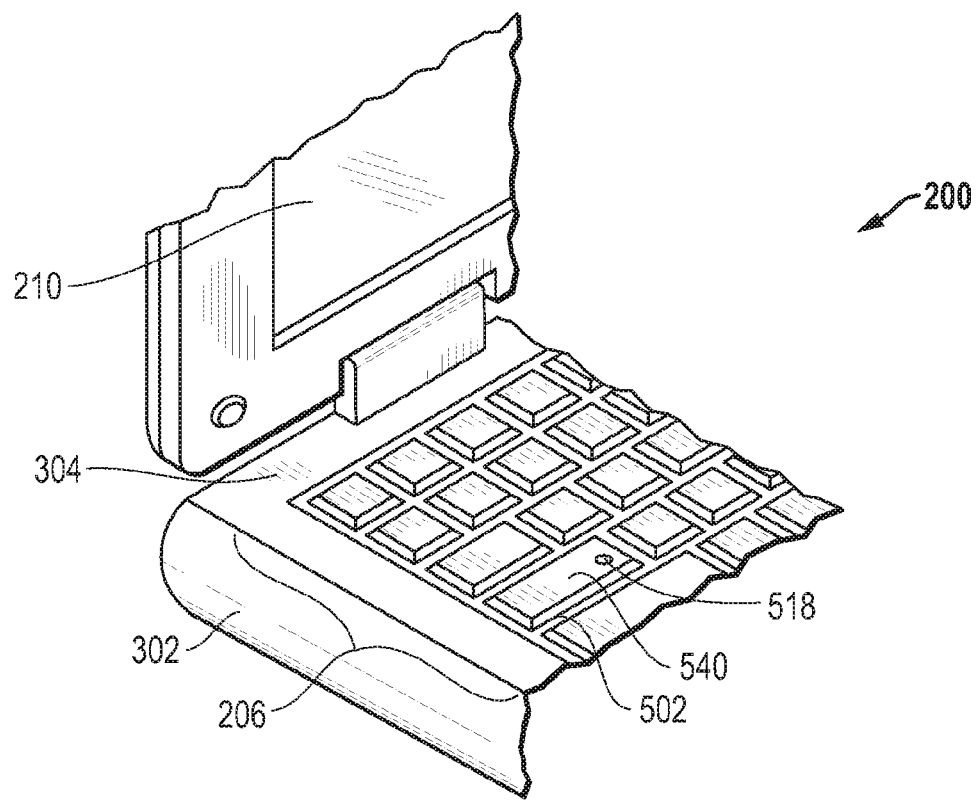
FIG. 3 is a partial perspective view of an information handling system according to one exemplary embodiment of the disclosed devices and methods.

FIG. 3 illustrates one exemplary embodiment of an information handling system 200 as it may be configured as a notebook computer. In this embodiment, information handling system 200 includes a chassis 302 having a top surface 304. Display 210 is provided within a lid that is moveably and hingeably coupled to the chassis 302 as shown. In this exemplary embodiment an input device is provided as an integral keyboard assembly 206 that is positioned adjacent top surface 302 of information handling system 200, although it will be understood that the disclosed devices and methods may be implemented with keyboard assemblies that are separable from the chassis of an information handling system and/or may be implemented with types of information handling systems other than notebook computers. As further shown in FIG. 3, keyboard assembly 206 is a QWERTY keyboard that includes a keycap 502 having a light-transmitting indicator feature 518 (e.g., aperture defined in the keycap, lightguide molded within the keycap, etc.) that is present for transmitting light from below and through the keycap 502 to a user of a keyboard assembly viewing the keycap 502 from above the upper surface 540 of keycap 502.

As will be further described herein, a key device 500 is provided that includes keycap 502 and other mechanism and circuitry beneath keycap 502 that is configured for mechanically and electrically accepting input from a user, and for selectively illuminating light transmitting indicator feature 518 to indicate status condition/s of at least one component of the information handling system. In this regard, the disclosed devices and methods may be implemented in one exemplary embodiment to use an indicator light element 512 to selectively illuminate light transmitting indicator feature 518 of a given keycap 502 in a manner that confines visible illumination from above the key device 500 to light transmitting indicator feature 518, i.e., indicator light element 512 illuminates light transmitting indicator feature 518 to a keyboard user while at the same time it does not illuminate to the same keyboard user the surrounding keycaps of the same keyboard assembly or other portions of the given keycap 502 (including the peripheral edges of the given keycap 502).

Although a particular exemplary embodiment of keycap 502 and keyboard assembly 206 is illustrated herein, it will be understood that the disclosed sub-membrane keycap indicator may be implemented with any other keycap and/or keyboard assembly configuration for information handling systems that employs keyboard switch membrane circuitry, including with other keycap shapes, with keyboards having differing number of keys and non-QWERTY keyboard configurations. Moreover, the disclosed sub-membrane keycap indicator may be employed with keyboards for other types of information handling systems besides portable information handling systems such as notebook computers, e.g., including, but not limited to, external keyboards for desktop computers.

Figure 4:
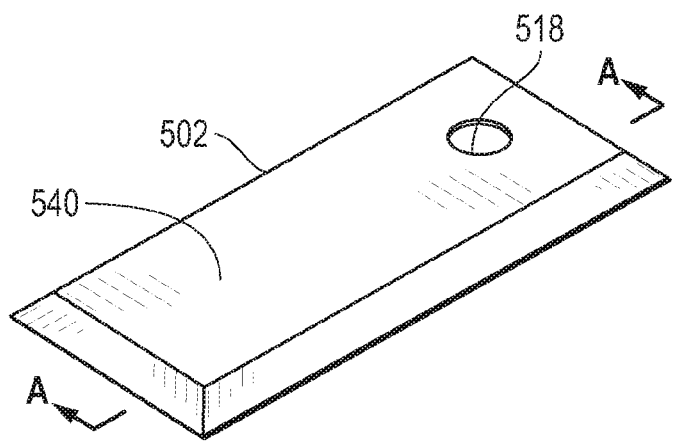
FIG. 4 is a perspective view of keycap according to one exemplary embodiment of the disclosed devices and methods.

FIG. 4 illustrates a further perspective view of keycap 502 showing light transmitting indicator feature 518 defined in the upper surface 540 of the keycap 502. It will be understood that an aperture may be provided in any shape or size within keycap 502 suitable for transmitting light upwards from the upper surface 540 of keycap 502 for observation by a user of the keyboard assembly 206. Moreover, an optional transparent or translucent lightguide may or may not be provided within the aperture to transmit light through the keycap 502. Examples of suitable light guide materials include, but are not limited to, translucent grades of Polycarbonate (PC), Acrylonitrile Butadiene Styrene (ABS), PC/ABS blends, Acrylic, Glass. It will also be understood that a lightguide may be colored or covered with a colored mask to alter the appearance of the light transmitted by the light guide. When no lightguide is present, an aperture may simply transmit light through the keycap 502 in substantially unaltered form.

Figure 5:
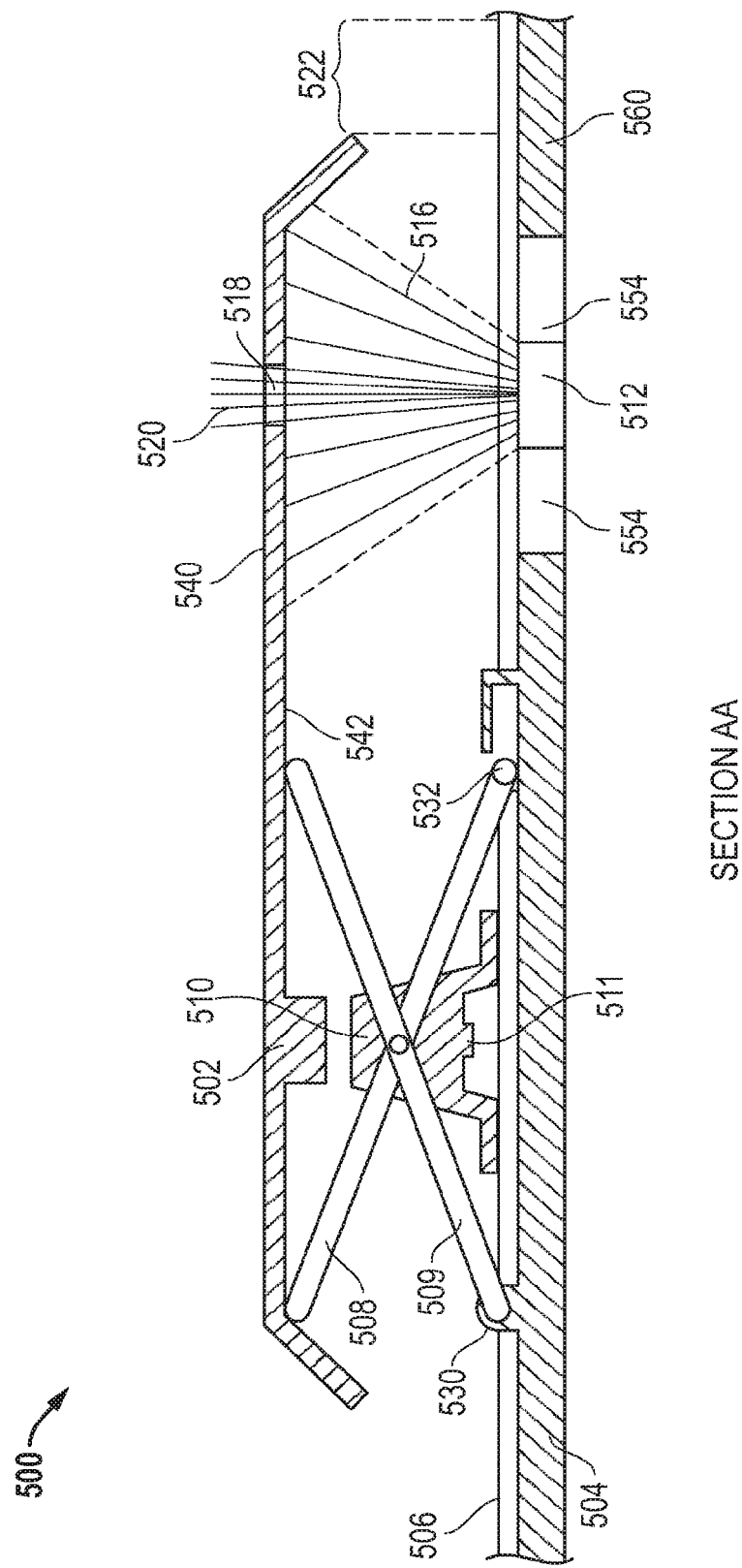
FIG. 5 is a cross-sectional view of a key device according one exemplary embodiment of the disclosed devices and methods.

FIG. 5 illustrates cross sectional view of a key device 500 that includes section AA of keycap 502 and also underlying mechanism and circuitry of key device 500. In this exemplary embodiment, keycap 502 is supported by a collapsible dual lever (scissor) action key stabilizer mechanism that supports the keycap 502 by utilizing mating plastic lever stabilizer members 508 and 509 that are secured at one end through a multi-layer keyboard switch membrane circuit 506 (silver ink on Mylar) to a baseplate 504 of a notebook keyboard assembly at a hinge point 532 and to a slidable stopper 532 at the other end. In one embodiment, switch membrane circuit 506 may include two separated circuit trace layers at the location of each key device 500 in a multi-key keyboard assembly 206. These circuit trace layers are in turn coupled to switch matrix and keyboard controller 207.

The mating lever members 508 and 509 are configured to pivot downward relative to each other with a scissor-like action when the keycap 502 is depressed, and are provided with a spring mechanism in the form of a resilient rubber dome member 510 that returns the keycap 502 upward to its unpressed position when the keycap 502 is no longer pressed. Rubber dome 510 is also configured with a center actuator 511 to contact and depress separated circuit trace layers together within switch membrane circuit 506 so as to make electrical contact and complete an electrical circuit for a key input signal at the location of key device 500 when keycap 502 is depressed (i.e., creating an active signal indicating the keycap has been depressed). In an alternate embodiment, switch membrane 506 may be a single layer switch membrane that has two separated contacts in the same layer. In such an alternate embodiment, center actuator 511 may be provided with an electrically conductive element that contacts and bridges the separated contacts of the single layer membrane 506 to complete the electrical circuit for a key input signal at the location of key device 500 when keycap 502 is depressed.

It will be understood that mating lever members 508 and 509 with rubber dome 510 and switch membrane circuit 506 represent just one example of a combination of key stabilizer mechanism, spring mechanism, and switch circuitry components that may be present beneath a keycap 502 of the disclosed devices and methods for accepting input from user. Examples of alternative key stabilizer mechanisms include, but are not limited to, synchronized levers, monoblock rubber membrane keycap assemblies, cantilever or pivoting keycaps, metal spring and lever assemblies, torsion bars, etc. Examples of alternative spring mechanism include, but are not limited to, metal springs, etc. Examples of suitable switch circuitry include, but are not limited to, single and multi-layer printed membranes, printed circuit boards, etc.

FIG. 5 also illustrates a light transmitting indicator feature 518 that is present for transmitting an indicator light between lower surface 542 and upper surface 540 of keycap 502 to be visible to a user of a keyboard assembly 206 that includes the key device 500. For example, keycap 502 may be a part of a multi-mode key device 500 that is configured to accept user input that changes the input processing mode for keyboard assembly 206, such as a "CAPS LOCK" key, "NUM LOCK" key, "SCROLL LOCK" key, etc. In such an embodiment, light 520 may be selectively projected from light transmitting indicator feature 518 to indicate when the keyboard assembly 206 of the corresponding notebook computer is in a particular input processing mode (e.g., "CAPS LOCK" mode, "NUM LOCK" mode, "SCROLL LOCK" mode, etc.) and not projected from light transmitting indicator feature 518 when the keyboard assembly 206 is not in such a mode. It will be understood that a multi-mode key device may be employed to accept user input that changes other input processing modes of a keyboard assembly 206 and/or other components of an information handling system 200, and/or may be configured to selectively indicate more than two different modes, e.g., using multiple colors and/or by providing multiple indicator aperture and lightguides 518 for indicating more than two different modes or states of one or more components of information handling system 200.

Still referring to FIG. 5, an indicator light element 512 (e.g., such as a LED element, multi-color LED element, etc.) may be embedded within baseplate 504 in a position beneath a translucent or substantially transparent switch membrane circuit 506 of key device 500, e.g., a translucent or substantially transparent membrane material such as polyethylene terephthalate (PET) like Mylar. Baseplate 504 may be an aluminum base plate, stainless steel ("SUS"), steel, baseplate, or of any other material and construction suitable for a keyboard assembly baseplate. Light element 512 may be embedded within baseplate 504 in any suitable manner, e.g., for example a cavity 554 may be punched or otherwise formed within baseplate 504 of suitable shape and dimension to receive indicator light element 512 such that indicator light element 512 may be placed with its upper surface in a position no higher than the surrounding level of upper surface 560 of baseplate 504 and beneath switch membrane circuit 506 of key device 500. For example, cavity 554 may be formed to extend completely through baseplate 504 as shown in FIG. 5, or may alternative be formed to only partially extend through baseplate 504 (e.g., such as in the configuration of a depression formed deep enough in the upper surface 560 of baseplate to accept light element 512 so that the upper surface of light element 512 may be positioned flush with or below the upper surface 560 of baseplate 504).

As further shown, in this exemplary embodiment the location of cavity 554 and indicator light element 512 is not beneath (and not aligned underneath) mating lever members 508 and 509 of the key stabilizer mechanism or with rubber dome 510. Rather, cavity 554 and indicator light element 512 are positioned off to the side (and non-aligned underneath) mating lever members 508 and 509 of the key stabilizer mechanism and rubber dome 510, i.e., such that cavity 554 and indicator light element 512 are not overlain by either the key stabilizer mechanism components or rubber dome 510.

In the embodiment of FIG. 5, an indicator light element 512 may be positioned as shown to direct light upward to aperture or lightguide 518 defined (e.g., molded) into the keycap 502 in order to illuminate or light the indicator aperture or lightguide 518, e.g., to indicate status of one or more components of the information handling system (such as a "Caps Lock", "Num Lock", "Scroll Lock", etc. status of keyboard input signal processing). As shown, indicator aperture or lightguide 518 may be provided within the body of keycap 502 in a position that is off center relative to the center of keycap 502, and near one peripheral edge of keycap 502. Indicator light element 512 may be secured within cavity 554 in any suitable manner, e.g., using adhesive such as UV glue (epoxy, Pressure Sensitive Adhesive (PSA), etc.) or other suitable securing material which may completely or only partially fill cavity 554. Indicator light element 512 may be electrically connected to illumination circuitry in switch membrane circuit 506 by, for example, silver ink, etc.

As shown in FIG. 5, a status-indicating light from indicator light element 512 may be directed upwardly in a pattern that is substantially narrow (e.g., as a substantially narrow cone 516) to illuminate transmitting indicator feature 518 with substantially no bleed of light outward from under the keycap 502 in the space between the keycap 502 and the baseplate 504 to the peripheral area 522 or anywhere else outside the perimeter of the edges of keycap 502 For example, an indicator light element 512 may be directed upwardly in a pattern that is substantially narrow to operatively illuminate an indicator aperture or light guide 518 positioned within a distance of less than or equal to about 1 mm (alternatively less than or equal to about 2 mm, alternatively less than or equal to about 3 mm, alternatively less than or equal to about 4 mm, alternatively less than or equal to about 5 mm) to the peripheral edge of a keycap with substantially no light bleed occurring from under the keycap 502 to the peripheral area 522 or anywhere else outside the perimeter of the keycap 502. Alternatively, an indicator light element 512 may be directed upwardly in a pattern that is substantially narrow to operatively illuminate an indicator aperture or light guide 518 positioned within a distance of from about 1 mm to about 5 mm to the peripheral edge of a keycap with substantially no light bleed occurring from under the keycap 502 to the peripheral area 522 or anywhere else outside the perimeter of the keycap 502.

It will also be understood that a mask may be optionally provided over the indicator light element 512 in a position that further reduces or substantially eliminates unwanted light bleed past the periphery of the overlying keycap 502 that contains the indicator lightguide 518. Such a mask may be formed, for example, by utilizing opaque membrane ink printing to mask around and above the indicator light element 512. Alternatively, an additional separate masking sheet with one or more opaque areas (e.g., Mylar sheet with masking ink or paint on top and/or bottom surfaces) may be provided above the translucent or substantially transparent switch membrane circuit 506 of FIG. 5. In such an alternative embodiment, the separate masking sheet may be provided with an aperture in an opaque area that is provided over the indicator light element 512, i.e., to permit light from the indicator light element 512 to pass through the separate masking sheet upwards to illuminate transmitting indicator feature 518.

Figure 6:
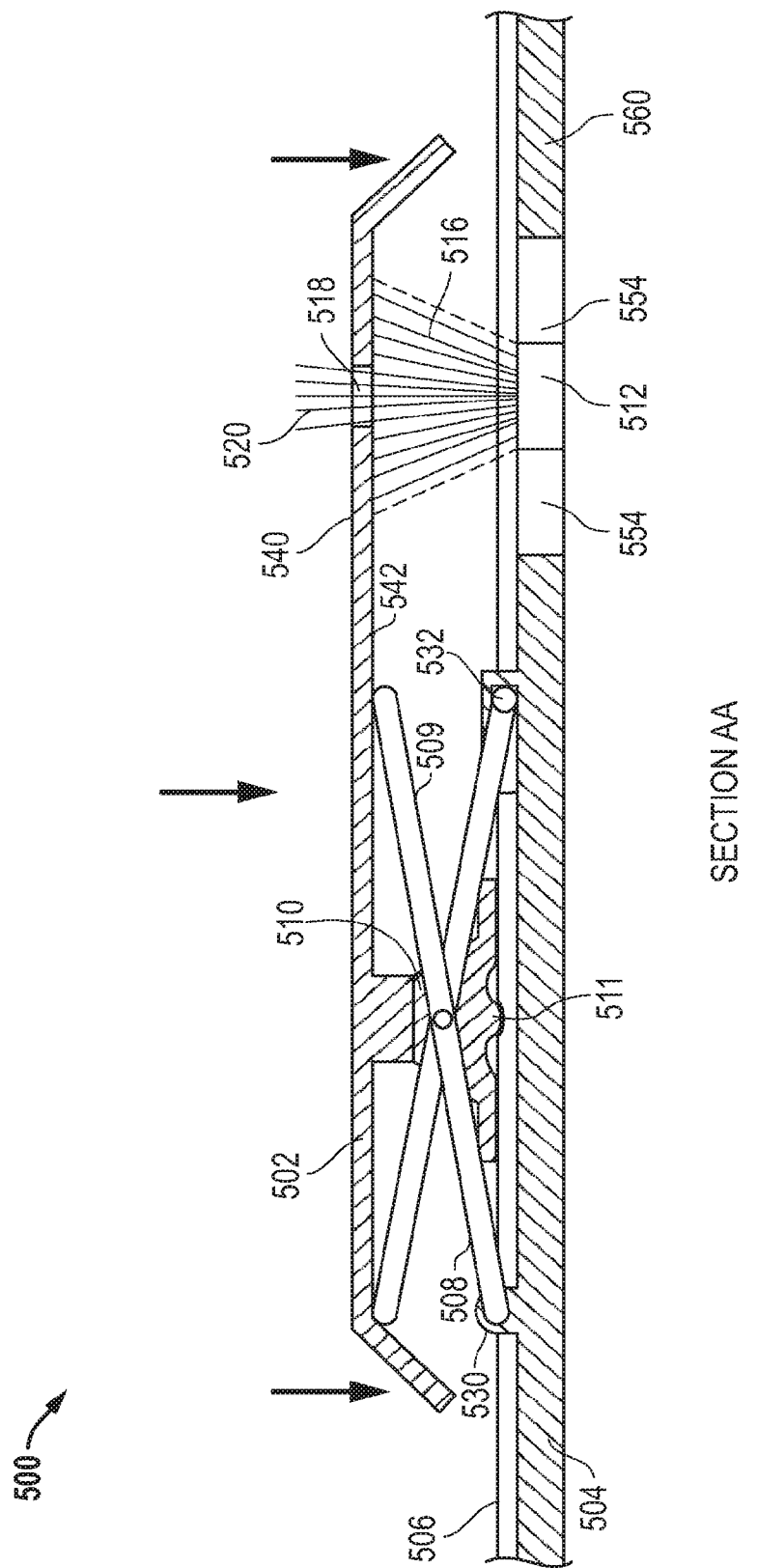
FIG. 6 is a cross-sectional view of a key device according one exemplary embodiment of the disclosed devices and methods.

FIG. 6 illustrates the key device embodiment of FIG. 5 with keycap 502 in the depressed condition, as would occur when keycap 502 is depressed by a user. As shown in FIG. 6, keycap 502 has been depressed in the direction of the arrows to a position closer to baseplate 504 and switch membrane circuitry 506. When so depressed mating lever members 508 and 509 pivot relative to each other and stabilize keycap 502 as it moves downward to collapse resilient rubber dome member 510 so that it makes contact and depresses circuitry layers of switch membrane circuit 506. This action causes electrical contact to be made within switch membrane circuit 504 to complete an electrical circuit for a key input signal when keycap 502 is depressed. As shown, indicator lightguide 518 remains illuminated by indicator light element 512 in its depressed position, with substantially no light bleed from under the keycap 502 to the peripheral area 522 or other areas outside the perimeter edges of the keycap 502.

Figure 7:
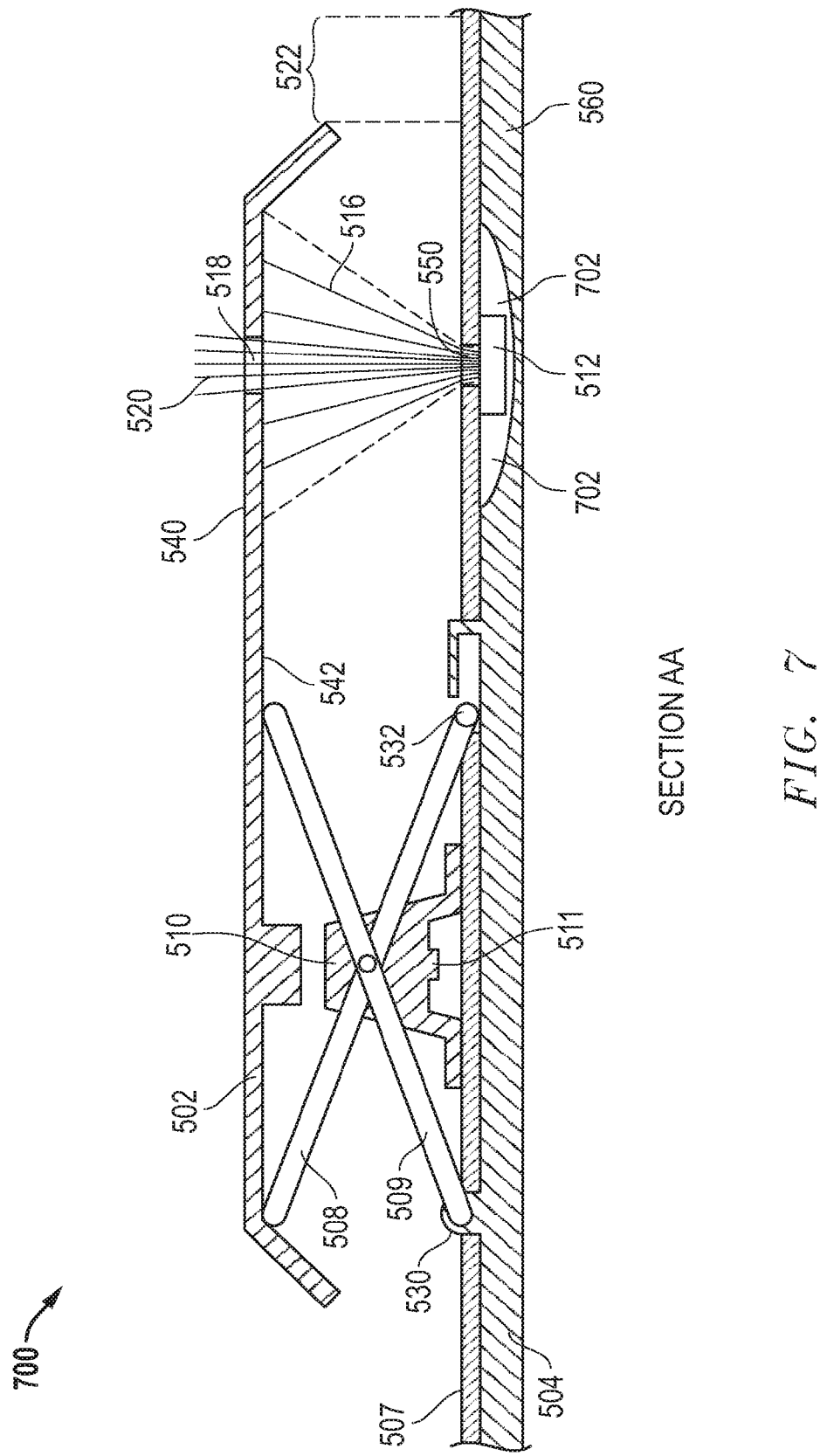
FIG. 7 is a cross-sectional view of a key device according one exemplary embodiment of the disclosed devices and methods.

FIG. 7 illustrates an alternative embodiment of a key device 700 in which an indicator light element 512 is positioned within a cavity in the form of depression 702 formed in the baseplate 504 of a key device 100 beneath a substantially opaque switch membrane circuit 507, with a light transmitting aperture 550 defined in the switch membrane circuit 507 above the indicator light element 512 as shown. Examples of opaque membrane materials include, but are not limited to, a fiberglass reinforced epoxy laminate such as FR-4. As illustrated in FIG. 7, light transmitting aperture 550 does not extend completely through baseplate 506. Otherwise, operation of key device 700 is substantially the same as described in relation to FIG. 5.

Figure 8:
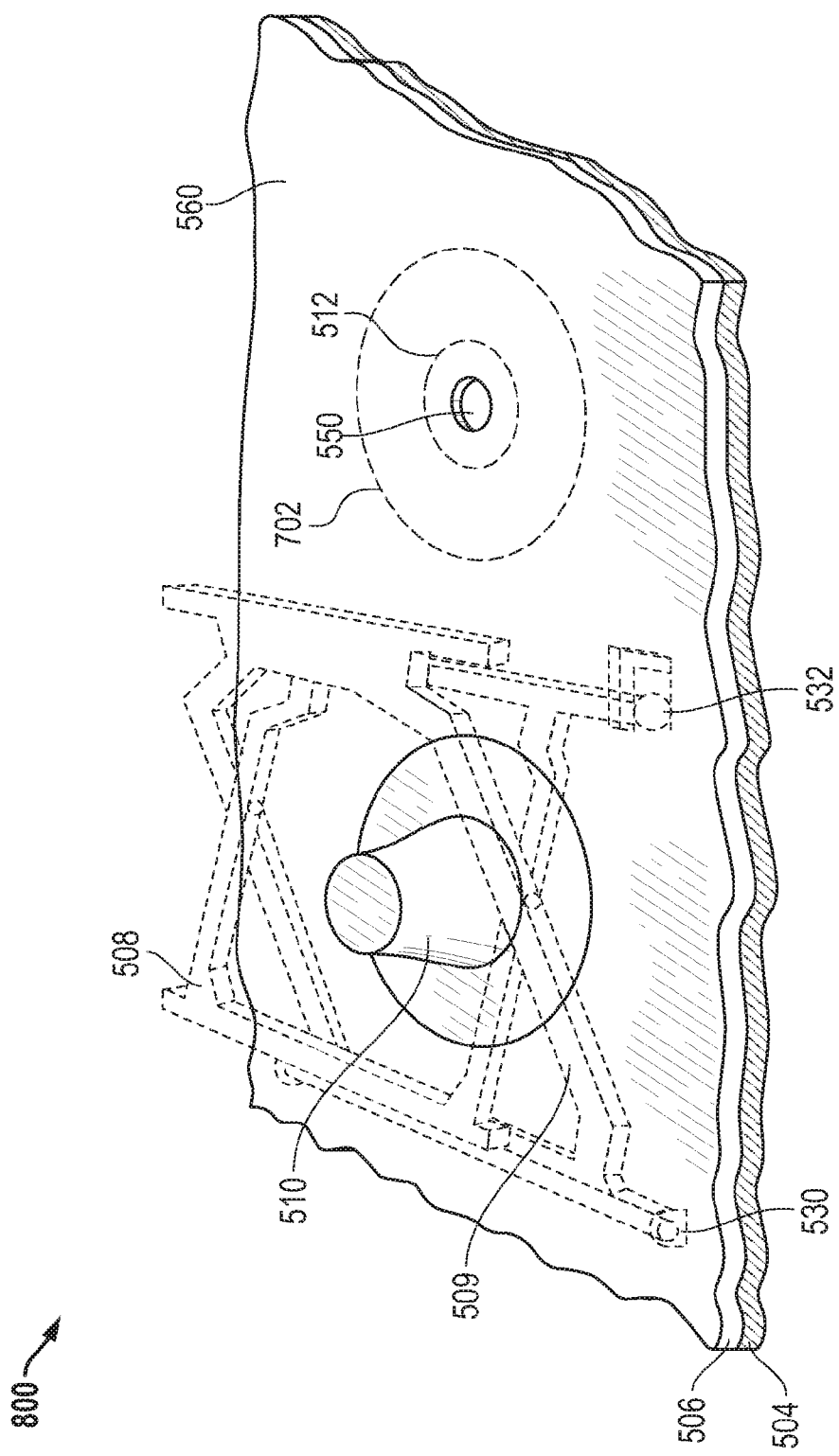
FIG. 8 is an overhead perspective view of a key device according one exemplary embodiment of the disclosed devices and methods.

FIG. 8 illustrates an overhead perspective view of a key device without overlying keycap and mating lever members 508 and 509 or other key device mechanism shown. The embodiment of FIG. 8 corresponds to key device 700 of FIG. 7, showing aperture 550 defined in opaque switch membrane circuit 507 and rubber dome member 510 projecting upwards from switch membrane circuit 507. FIG. 8 also illustrates positioning of cavity 702 and indicator light element 512 beneath opaque switch membrane circuit 507 using hidden lines. It will be understood that relative positioning of rubber dome member 510, cavity 554, and indicator light element 512 appear similar for the embodiment of FIGS. 5 and 6, with the exception that no aperture 550 is formed in the translucent or substantially transparent switch membrane circuit 506. FIG. 8 also shows the installed position for plastic lever stabilizer members 508 and 509 of the exemplary collapsible dual lever (scissor) action key stabilizer mechanism in dashed outline, it being understood that orientation of mating plastic lever stabilizer members 508 and 509 and other components of the key stabilizer mechanism relative to indicator light element 512 may be varied, e.g., oriented 90 degrees relative to the positioning shown.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed devices and methods may be utilized in various combinations and/or independently. Thus the invention is not limited to only those combinations shown herein, but rather may include other combinations.

What is claimed is:
1. A key device, comprising:
a baseplate;
a keycap coupled to the baseplate in spaced upward and downward movable relationship, a light transmitting feature being provided in the keycap and configured to transmit light through the keycap;
switch membrane circuitry disposed above the baseplate and between the keycap and the baseplate, at least a portion of the switch membrane circuitry being configured to transmit light from below the membrane to above the membrane; and
an indicator light element embedded within the baseplate and configured to direct light upward from within the baseplate through the switch membrane circuitry to the light-transmitting indicator feature within the keycap.

2. The device of claim 1, where the indicator light element is disposed within a cavity defined in the baseplate.

3. The device of claim 1, where the indicator light element comprises a light emitting diode (LED).

4. The device of claim 1, where the switch membrane circuitry is translucent or substantially transparent.

5. The device of claim 1, where the switch membrane circuitry is opaque; and where a light transmitting aperture is defined within the switch membrane circuitry in a position above the indicator light element to allow light from the indicator light element to pass through the opaque switch membrane circuit.

6. The device of claim 1, where the keycap has peripheral edges; and where the indicator light element is configured to direct light upward from within the baseplate through the switch membrane circuitry to the light-transmitting indicator feature in a pattern that is sufficiently narrow to substantially prevent any light bleed out from under the keycap between the baseplate and the keycap past the peripheral edges of the keycap.

7. An information handling system comprising:
   at least one processing device;
   at least one key device coupled to the processing device, the key device comprising:
      a baseplate,
      a keycap coupled to the baseplate in spaced upward and downward movable relationship, a light transmitting feature being provided in the keycap and configured to transmit light through the keycap,
      switch membrane circuitry disposed above the baseplate and between the keycap and the baseplate, the switch membrane circuitry being configured to provide an input signal to the processor in response to downward pressure applied to the switch membrane circuitry by downward movement of the keycap, and at least a portion of the switch membrane circuitry being configured to transmit light from below the membrane to above the membrane, and
      an indicator light element embedded within the baseplate and configured to direct light upward from within the baseplate through the switch membrane circuitry to the light-transmitting indicator feature within the keycap.

8. The system of claim 7, further comprising: a key stabilizer mechanism coupled between the baseplate and the keycap, the keycap being coupled to the baseplate in spaced upward and downward movable relationship by the key stabilizer mechanism; and a spring mechanism coupled between the keycap and the baseplate.

9. The system of claim 7, further comprising a keyboard assembly that comprises the key device; a portable information handling system chassis; and where the keyboard assembly and the at least one processing device are integrated together into the portable information handling system chassis.

10. The system of claim 7, where the indicator light element is disposed within a cavity defined in the baseplate, and where the switch membrane circuitry is translucent or substantially transparent.

11. The system of claim 7, where the switch membrane circuitry is opaque; and where a light transmitting aperture is defined within the switch membrane circuitry in a position above the indicator light element to allow light from the indicator light element to pass through the opaque switch membrane circuit.

12. The system of claim 7, where the keycap has peripheral edges; and where the indicator light element is configured to direct light upward from within the baseplate through the switch membrane circuitry to the light-transmitting indicator feature in a pattern that is sufficiently narrow to substantially prevent any light bleed out from under the keycap past the peripheral edges of the keycap.

13. The system of claim 7, where the at least one processor is configured to selectively illuminate the indicator light element to indicate the status of at least one component of the information handling system.

14. A method of illuminating an indicator keycap of a key device, comprising:
   providing a key device comprising:
      a baseplate,
      a keycap coupled to the baseplate in spaced upward and downward movable relationship, a light transmitting feature being provided in the keycap and configured to transmit light through the keycap, and
      switch membrane circuitry disposed above the baseplate and between the keycap and the baseplate, and
      an indicator light element embedded within the baseplate; and
   directing light upward from the indicator light within the baseplate through the switch membrane circuitry to the light-transmitting indicator feature within the keycap.

15. The method of claim 14, where the indicator light element is disposed within a cavity defined in the baseplate.

16. The method of claim 14, where the switch membrane circuitry is translucent or substantially transparent.

17. The method of claim 14, where the switch membrane circuitry is opaque; and where a light transmitting aperture is defined within the switch membrane circuitry in a position above the indicator light element to allow light from the indicator light element to pass through the opaque switch membrane circuit.

18. The method of claim 14, where the keycap has peripheral edges; and where the method further comprises directing light upward from the indicator light within the baseplate through the switch membrane circuitry to the light-transmitting indicator feature in a pattern that is sufficiently narrow to substantially prevent any light bleed out from under the keycap between the baseplate and the keycap past the peripheral edges of the keycap.

19. The method of claim 14, further comprising selectively illuminating the indicator light element to indicate the status of at least one component of the information handling system.

20. The device of claim 2, where the cavity is defined to only partially extend through the baseplate.

21. The device of claim 2, where the indicator light element is disposed within the cavity such that an upper surface of the indicator light element is positioned no higher than an upper surface of the baseplate that surrounds the cavity.

22. The system of claim 7, where the indicator light element is disposed within a cavity defined to only partially extend through the baseplate.

23. The system of claim 7, where the indicator light element is disposed within a cavity defined in the baseplate such that an upper surface of the indicator light element is positioned no higher than an upper surface of the baseplate that surrounds the cavity.

24. The method of claim 15, where the cavity is defined to only partially extend through the baseplate.

25. The method of claim 15, where the indicator light element is disposed within the cavity such that an upper surface of the indicator light element is positioned no higher than an upper surface of the baseplate that surrounds the cavity.

26. The system of claim 9, where the system chassis has a top surface; where the keyboard assembly is positioned relative to the chassis such that the key cap is positioned adjacent the top surface of the chassis with the baseplate being positioned below the top surface of the chassis.

27. The method of claim 14, further comprising a keyboard assembly that comprises the key device and a portable information handling system chassis, the keyboard assembly and the at least one processing device being integrated together into the portable information handling system chassis having a top surface; where the keyboard assembly is positioned relative to the chassis such that the key cap is positioned adjacent the top surface of the chassis with the baseplate being positioned below the top surface of the chassis.

* * * * *